June 14, 1966 R. G. GIRARD 3,255,731
APPARATUS FOR REARING TROPICAL FISH
Filed June 19, 1964 2 Sheets-Sheet 1

INVENTOR.
RAYMOND G. GIRARD
BY
*Barlow & Barlow*
ATTORNEYS

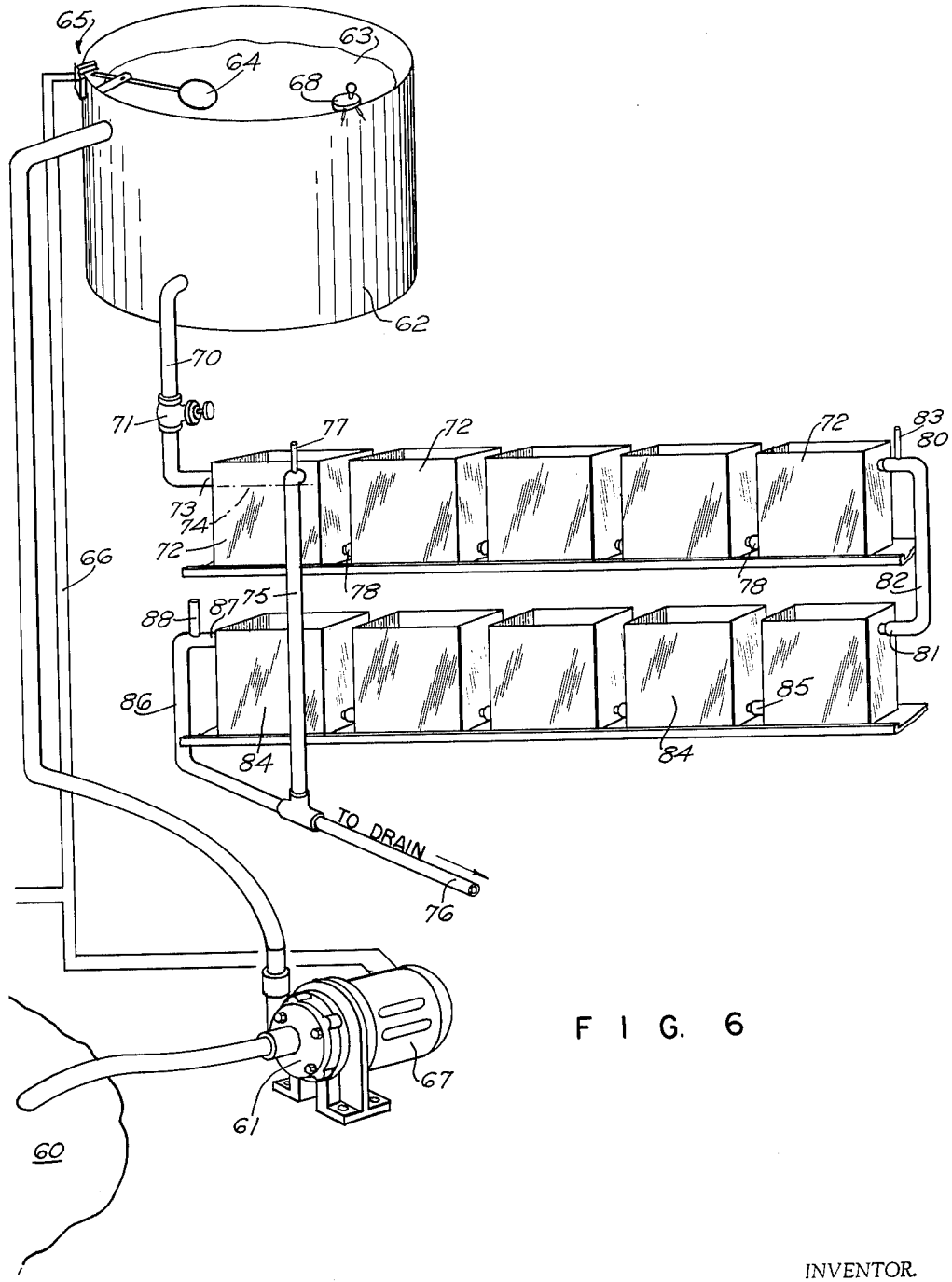

United States Patent Office 3,255,731
Patented June 14, 1966

3,255,731
APPARATUS FOR REARING TROPICAL FISH
Raymond G. Girard, 224 Ashley Blvd.,
New Bedford, Mass.
Filed June 19, 1964, Ser. No. 376,456
2 Claims. (Cl. 119—3)

This invention relates to the rearing of tropical fish, more particularly the Betta species.

In the rearing of tropical fish of the Betta species, often referred to as Siamese Fighting Fish, which are native to Thailand and which have a plurality of different colors, it is known that if two fish, especially male fish, are put together in a confined space, they will attack each other so viciously that in a short time one will be killed and the victor is often so mutilated that he is not much better off. The species are gorgeous and are very desirable to aquarists; however, they do present problems in rearing, one of which is to separate the males after a certain period of time to prevent their exercising this fighting instinct.

Another problem is that of maintaining the fish in water which is at a sufficient temperature so that they will live and when the water is changed to prevent too sharp a contrast or temperature change as this may kill the fish.

Further, there is the problem of keeping the water clean, which has heretofore been done by changing the water and also of providing the water of the proper chemical content as to acidity, a neutral solution or pH 7 being desirable or as to dH concentration of calcium and magnesium. Too great a variation in these qualities is harmful to the fish and may cause them to die.

One of the objects of this invention is to improve and accelerate the growth to maturity of tropical fish of the Betta species in a minimum time and in a limited space with a limited supply of water.

Another object of this invention is to provide for the maintaining of the fish in separate compartments to prevent their destruction of one another and of providing a uniform water content of pH value and dH value throughout the plurality of compartments that are provided.

Another object of this invention is to provide a control over a large amount of water with respect to any one of the compartments so that any change that may be had in the pH or dH concentrations will be more gradual than might occur in any single compartment and then to utilize this larger volume of water in all of these compartments.

Another object of this invention is to circulate in a closed circuit the water in the various compartments from one to another so that the uniform concentrations of pH and dH value may be maintained throughout the system.

Another object of this invention is to provide in a closed circuit a circulation of water through the various compartments and to filter foreign matter from the circulating water at one location so that any contamination of the water may be removed at one location to satisfy the condition of the entire system and the multiplicity of compartments which are utilized.

A still further object of the invention is to minimize the work which will be necessary in the maintaining of a large number of compartments suitable for the individual separated fish.

A further object of the invention is to provide in a circulating system a means by which the very fact of circulation will consist in maintaining the conduits between compartments clear of the accumulation of any foreign matter.

Another object of the invention in a closed circuit of this character is the provision of medication to all of the compartments by feeding the medication into the liquid at one location.

Another object of the invention is to control the temperature of the liquid in the system at one location by reason of its circulation through the various compartments which are involved.

With these and other objects in view, the invention consists of certain novel features of construction as will be more fully described and particularly pointed out in the appended claims.

In the accompanying drawings:

FIG. 6 is a diagrammatic view of a modified form of apparatus showing the individual compartments on more than one level.

In proceeding with this invention, I provide a plurality of compartments each for containing one Siamese Fighting Fish and provide some communication from one compartment to another serially, so that liquid may be circulated through the system from one compartment to another either in a closed system where water is to be conserved or from a source of supply to waste where water is plentiful; and I interpose in such systems a filter, a heater and some means for maintaining circulation of the water through the system. The compartments may be variously arranged or hooked up and may be arranged in two groups in parallel with a series connection of the compartments in each group, on a single level or at different levels with suitable vents as space may be afforded for the system.

Figure 1:
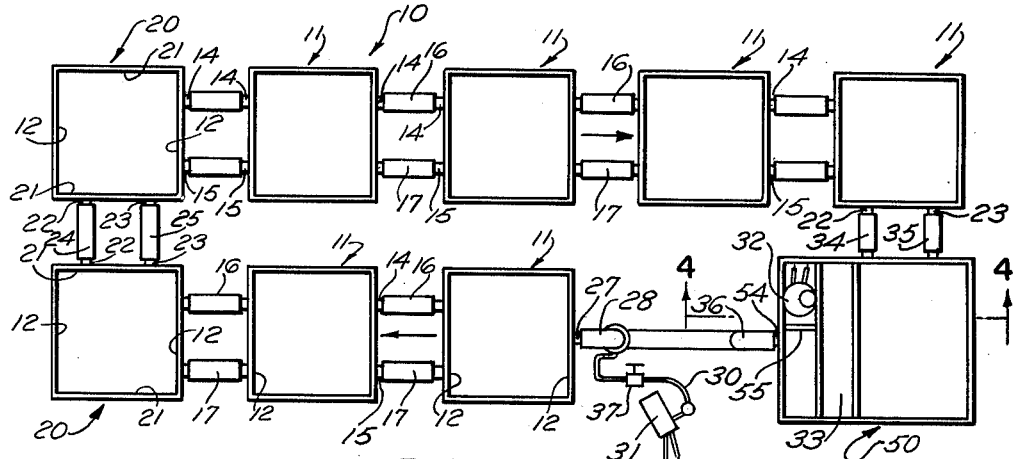
FIG. 1 is a top plan view illustrating the elements of the fish rearing apparatus of this invention.

With reference to the drawings, I have shown in FIG. 1 a plurality of separate compartments 10 on a single level each of which is of a sufficient size to contain one of the tropical fish of the Betta species and this compartment will usually be of some transparent material such as some plastic which may permit viewing of the fish within. A cover may or may not be provided as surroundings dictate. Each container is provided with some means for communication with the next container for the flow of liquid therethrough. As shown in the drawing, opposite side walls 12 of the container 11 are provided with integral tubular bosses 14 and 15 extending from the walls 12 which may be connected to the next container 11 by some sort of a flexible, pliable, elastic, plastic or rubber tube 16 and 17 slipped over the bosses 14 and 15 in order to connect them together. The bosses 14 and 15 will be of such a size that the tropical fish that is contained within the compartment 11 cannot escape therethrough. This series of compartments 11 may extend in the shape of a U or in a straight line for any desired length depending upon the space available and the number of fish which are to be maintained in any one group of this system. Where the arrangement is to be on a single level in the shape of a U, compartments 20 having end walls 12 and walls 21 at right angles thereto may be provided so that there will be bosses 14 and 15 at one end wall 12 while other bosses 22 and 23 will be on a wall 21 at right angles thereto to receive tubes 24 and 25 so that a corner may be provided as shown in FIG. 1 in the group of compartments.

Figure 2:
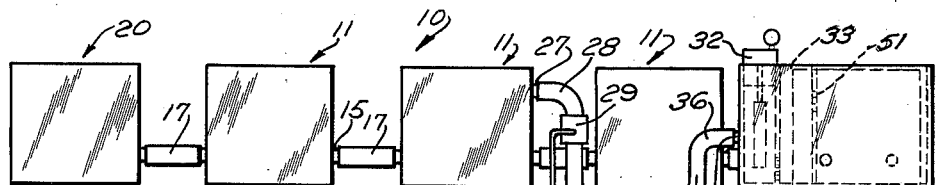
FIG. 2 is a side elevation thereof.
Figures 3, 4:
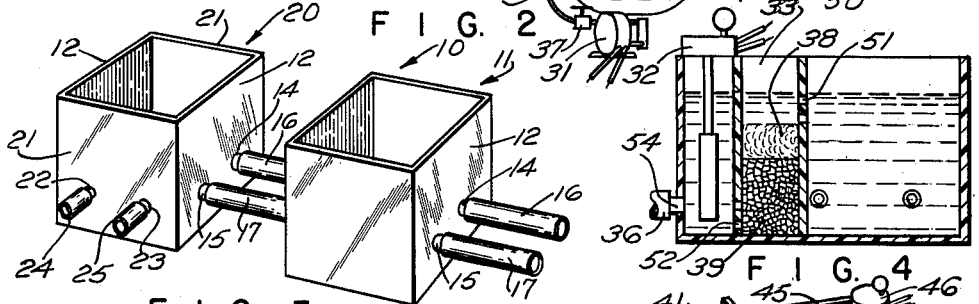
FIG. 3 is a perspective view showing two units of the system connected together.
FIG. 4 is a sectional view of the filter and heater.

The conduits from one compartment to another are adjacent the lower part of the compartment as seen in FIG. 3. However, the conduit to the first compartment of a group of compartments is adjacent the upper portion of the compartment as seen at 27 in FIG. 2.

A connection between the two end units of the group of compartments is provided so as to provide a closed liquid circuit. Here shown between the end units, I have a filter, a heater and a pump in a closed liquid circuit, as seen in FIG. 1.

A conduit 28 connected to boss 27 has an air injector 29 connected thereto so that air supplied through conduit 30 by motor 31 and air pump will force liquid into the first compartment 11 and will cause liquid to flow in a closed circuit through the group of compartments returning from bosses 22, 23 of the last compartment of the group through conduits 34, 35 to the end chamber of container 50 and then to a filter 33 and then to heater 32 and then to the injector by conduit 36. When it is desired to shut down the circulation in the system, it is merely necessary to close the valve 37 shutting off the air supply to the injector 29 which is desirable at intervals such as during the night so that the fish do not have to fight the flow, but may rest.

The filter is of a type using charcoal and glass wool in such an arrangement that the water may enter as at 51 and travel downwardly through the glass wool 38 and through the charcoal 39 and then pass through opening 52 at its lower portion into the heater chamber. The heater 32 which is thermostatically controlled is located in an end section of container 50 and will maintain the temperature of the water which enters at 52 and leaves at 54 at the desired heat level. A baffle 55 may be used (FIG. 1) to a height less than the height of the water level to cause the water flow to pass along a greater extent of the heater. The heater may be interposed at various locations in the closed circuit but conveniently adjacent the filter. Heating usually is in the seventies or eighties and often preferably around 82 degrees F. The end section of container 50 before the filter and the heater may be utilized for adding material to control the pH or dH of the entire system when desired.

Figure 5:
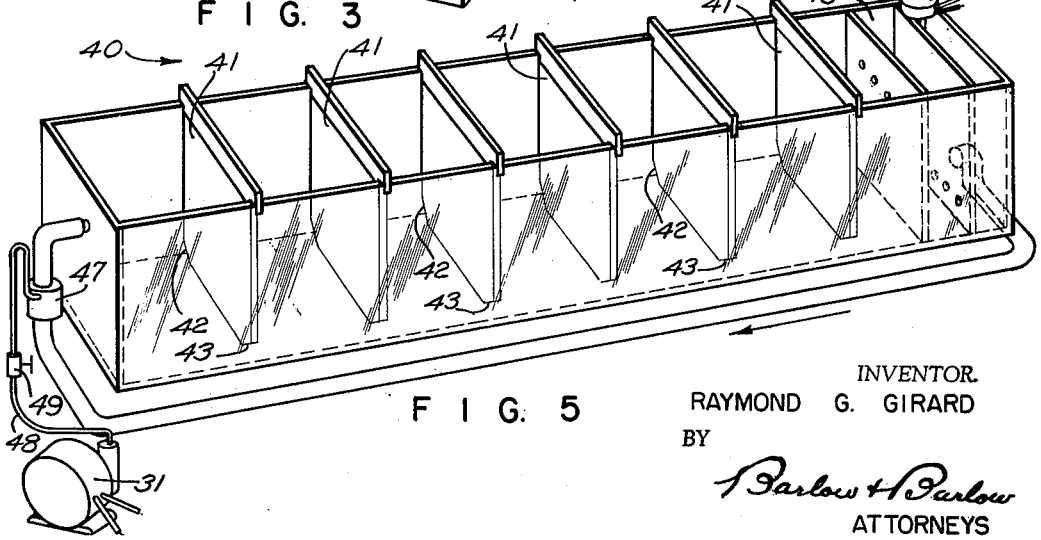
FIG. 5 is a perspective view of modified form of the apparatus.

In some cases instead of providing separate units and connecting them with some sort of a conduit between, which will permit the liquid water to pass but will not permit the fish to pass, I may provide a long tank such as shown in FIG. 5 at 40 having a plurality of divisions 41 therein set into notches in the side walls to hold them in place and which are so shaped at their corners 42 and 43 that liquid may pass from one compartment to another formed by these division walls 41 and yet will not permit the fish to pass. Additionally, holes may be provided through the walls 41 if desired. At one end of this compartment, there may be located a filter 45 and a heater 46 with some sort of a propelling air injector pump 47 with air intake supply and control valve 49 as above described.

In some cases, it is desirable to provide the different individual fish compartments at different levels for the accommodation of available space and where water is plentiful to discharge the water into a drain rather than to provide a closed circuit circulation as above described. In FIG. 6, I have illustrated an apparatus arranged for operation with these differences from that heretofore described.

In FIG. 6 from a source of water 60 a pump 61 elevates the water to a reservoir 62. The level 63 of the water in the reservoir is controlled by a float 64 which is arranged to close electrical contacts at 65 to complete an electrical circuit through conduits 66 to the electrical motor 67 which drives water pump 61 until the level in the reservoir rises to a certain extent when the float causes interruption of the circuit. A heater 68 may be utilized in the reservoir if the water from the source is of a temperature which may need heating. This storage tank 62 is located at a height above any of the compartments which are utilized for the fish so that by gravity flow through the conduit 70 controlled, as to volume supplied, by valve 71 feeds the group of compartments 72 at the upper level, the water being supplied at a point near the upper portion of the first compartment as at 73. In case the water level 74 gets above the certain amount an overflow pipe 75 will discharge the water through the drain 76 to a waste area. An air vent 77 may be utilized so that no air trap will be provided in such an overflow.

Beyond the first compartment 72, there are located other compartments similarly designated 72 and on substantially the same level. The connection between these compartments is through conduit 78 at the lower portion of each compartment similar to that in FIGS. 1 and 2, except that the group here is of five compartments although other numbers may be utilized. The discharge from the last compartment 72 designated as 80 is at the upper portion of the conduit and extends to the upper portion 81 of the first of a second group of compartments at a lower level through a downwardly extending conduit 82 vented as at 83 to prevent air trapping. This second group of compartments is each designated as 84 and also consists of a given number of compartments all at a certain level all lower than the first group and all connected by conduits 85. The last of these compartments 84 has a conduit 86 at the upper portion 87 of the last compartment 84 which is vented as at 88 and which extends either to another group of compartments at a lower level or to the drain 76 which latter condition is here shown. In this way, circulation is provided by gravity and control as to the amount desired is had by the valve 71. No filter is required in such an arrangement and likely no medication will be required; but if that may be necessary, it may be supplied in the first compartment and circulated through the remaining compartments at both levels.

Assuming that the eggs have hatched and the young ones are freely swimming, when these young reach a known state of growth, they must be separated and it is at this point that the further rearing of the fish takes place in the method of this invention and are from this point of separation grown in the apparatus which is above described. By reason of the temperature control the circulating water may be kept at the desired temperature and by reason of the compartment 50 adjacent the filter, the chemical content of the water may be kept as desired, it being desirable to keep the alkaline-acid concentration at substantially pH 7 which is neutral. Bicarbonate of soda may be added if the water is too acid or sodium biphosphate may be added if the water is too alkaline in order to bring the pH value back to substantially pH 7 which is neutral. Likewise the concentration of calcium and magnesium may be tested by drops of soap solution often referred to as a dH Kit already on the market and the concentration is desired to be kept between 1 and 12 degrees and this may be adjusted in a known manner in this same area 50 until the entire volume of water responds to the concentration desired. By reason of the large volume of water which is circulating, the temperature changes become gradual and likewise any change in pH or dH value becomes gradual. Likewise if any medication need be provided, it may be provided at one location such as the first compartment 11. The valve 37 may be utilized to shut off the circulation, such as during the night, so that the fish that is being reared may rest and not fight the stream of water. Of course, as indicated above, the filter takes out any foreign matter which is desired to be removed such as excretions from the fish and thus keeps the circulating medium clear. If a conduit becomes somewhat clogged, the water in the compartment next ahead of it will rise thereby increasing the pressure through the conduit and assisting in cleaning the conduit of such matter as may be clogging or restricting the same. The air injector serves not only as a pump for circulating the water but also aerates the water, and while it is not essential that the Betta species have air in the water, it is desirable for many purposes, such as maintaining oxygen for the control of bacteria and the like. Another advantage of a circulating system of this sort is that bacteria does not tend to grow as fast in a circulating system as in one that is stagnant and all of these factors promote the mode and accelerate the growth of the fish which are being reared.

It will be apparent that many ways may be provided for connecting one compartment to another only two having been shown here and the size and shape of the compartments may be varied, it being however preferable to standardize in any one system or branch of systems which may be utilized.

I claim:
1. A fish rearing and water circulation system comprising:
   (a) a plurality of compartments, each of a size to accommodate a single fish and each having a plurality of impervious walls;
   (b) a water transfer means comprising hollow bosses in at least two of said walls on the same horizontal level extending from the lower portion only of each compartment, each of a size to prevent passage of fish;
   (c) tubular means connecting said bosses for flow of liquid from one compartment to another serially through said compartments for circulation of liquid through said compartments and picking up debris at the lower portion of said compartment;
   (d) means for circulating water in said system.
2. A fish rearing and water circulation system as in claim 1 wherein
   (e) filtering means is in said circulation system of liquid for removing debris picked up by the circulating water in said system.

References Cited by the Examiner

UNITED STATES PATENTS

| | | | |
|---|---|---|---|
| 1,786,049 | 12/1930 | Zoeller | 119—73 |
| 2,696,800 | 12/1954 | Rork | 119—5 |
| 2,782,161 | 2/1957 | Willinger et al. | 210—16 |
| 2,944,513 | 7/1960 | Keely | 119—3 |
| 2,981,228 | 4/1961 | Brandano | 119—2 |
| 3,076,432 | 2/1963 | Jung et al. | 119—3 |
| 3,116,712 | 1/1964 | Ogden et al. | 119—5 X |
| 3,122,126 | 2/1964 | Yamada | 119—5 X |
| 3,139,402 | 6/1964 | Armburst | 210—50 |
| 3,140,691 | 7/1964 | Stark | 119—5 |
| 3,166,043 | 1/1965 | Castillo | 119—3 |

OTHER REFERENCES

The Aquarium: Innes Pub. Co., Oct. 1939, 119–5 page 4A.

SAMUEL KOREN, *Primary Examiner*.

ALDRICH F. MEDBERY, *Examiner*.